(12) United States Patent
Chang

(10) Patent No.: US 7,911,449 B2
(45) Date of Patent: Mar. 22, 2011

(54) MOUSE WITH DIRECTION-ADJUSTABLE CONNECTING WIRE

(76) Inventor: Yuan-Jung Chang, Hsin Chuang (TW)

( * ) Notice: Subject to any disclaimer, the term of this patent is extended or adjusted under 35 U.S.C. 154(b) by 1378 days.

(21) Appl. No.: 11/402,887

(22) Filed: Apr. 13, 2006

(65) Prior Publication Data

US 2007/0242044 A1 Oct. 18, 2007

(51) Int. Cl.
*G09G 5/08* (2006.01)
(52) U.S. Cl. ......... 345/163; 345/164; 345/165; 345/166
(58) Field of Classification Search .......... 345/163–166, 345/156
See application file for complete search history.

(56) References Cited

U.S. PATENT DOCUMENTS

| 5,406,692 | A | * | 4/1995 | Oishi | 29/564.6 |
| 7,358,957 | B2 | * | 4/2008 | Zhang | 345/163 |
| 2006/0023402 | A1 | * | 2/2006 | Chin | 361/600 |

* cited by examiner

*Primary Examiner* — Amr Awad
*Assistant Examiner* — Leonid Shapiro
(74) *Attorney, Agent, or Firm* — Rosenberg, Klein & Lee

(57) ABSTRACT

A mouse with direction-adjustable connecting wire includes a housing, a connecting wire and a turntable. The connecting wire has one end that is embedded in the housing. The turntable is pivotably disposed in the bottom of the housing, and the connecting wire is passed through the turntable and located therein. Thereby, a direction-adjustable connecting wire is designed to make the mouse is easy to be operated and has better controllability without causing the operational inconvenience; for this reason, it takes fully into account the requirements and operation habits of the different users.

6 Claims, 4 Drawing Sheets

MOUSE WITH DIRECTION-ADJUSTABLE CONNECTING WIRE

BACKGROUND OF THE INVENTION

1. Field of the invention

The present invention relates to a mouse with direction-adjustable connecting wire, and more particularly to the mouse has a direction-adjustable connecting wire that makes the mouse is easy to be operated, i.e. the mouse has better controllability.

2. Description of the Prior Art

A computer mouse is an important, hand-held and button-activated input device for desktop computers. When it is moved, it provides corresponding movement of a cursor on screen; with the flick of a wrist and the click of a button, an application can be launched, a function can be selected, text can be deleted or a line can be drawn. Both the mechanical and the optical one have been popular for a long time.

Centrally located within the bottom surface of the mouse is a hole through which a portion of the underside of a rubber-surfaced steel ball extends. The mouse pad is typically a closed cell foam rubber pad covered with a suitable fabric. Low friction pads on the bottom surface of the mouse slide easily over the fabric, but the rubber ball does not skid. Rather, the rubber ball rolls over the fabric as the mouse is moved. Interior to the mouse are rollers that contact the ball at its equator and convert its rotation into electrical signals representing orthogonal components of mouse motion. These electrical signals are coupled to a computer, where software responds to the signals to change by a $\Delta X$ and a $\Delta Y$ the displayed position of a cursor in accordance with movement of the mouse. The user moves the mouse as necessary to get the displayed pointer to a desired location or position. The activation serves as an instruction to take some action, the nature of which is defined by software in the computer.

However, in existing technology, not only mechanical mouse but optical mouse, a connecting wire 92 for transmitting signals from mouse to computer is fixedly connected to a housing 91 of the mouse 9 (shown in FIG. 1). And that, the connecting wire 92 can't be used to adjust the direction for the requirements and operation habits of the different users and the mouse 9 has worse controllability and inconvenient operation.

The inventor of the present invention recognizes the above shortage should be corrected and special effort has been paid to research this field. The present invention is presented with reasonable design and good effect to resolve the above problems.

SUMMARY OF THE INVENTION

It is a primary object of the present invention to provide a mouse with direction-adjustable connecting wire, that a direction-adjustable connecting wire is designed to make the mouse is easy to be operated and has better controllability without causing the operational inconvenience; for this reason, it takes fully into account the requirements and operation habits of the different users.

For achieving the objective stated above, the mouse with direction-adjustable connecting wire of the present invention comprises a housing, a connecting wire and a turntable. The connecting wire has one side that is embedded in the housing. The turntable is pivotably disposed in the bottom of the housing. The connecting wire is passed through the turntable and located therein.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The above and further advantages of this invention may be better understood by referring to the following description, taken in conjunction with the accompanying drawings, in which.

The drawings will be described further in connection with the following detailed description of the present invention.

DETAILED DESCRIPTION OF THE PREFERRED EMBODIMENTS

Figure 1:
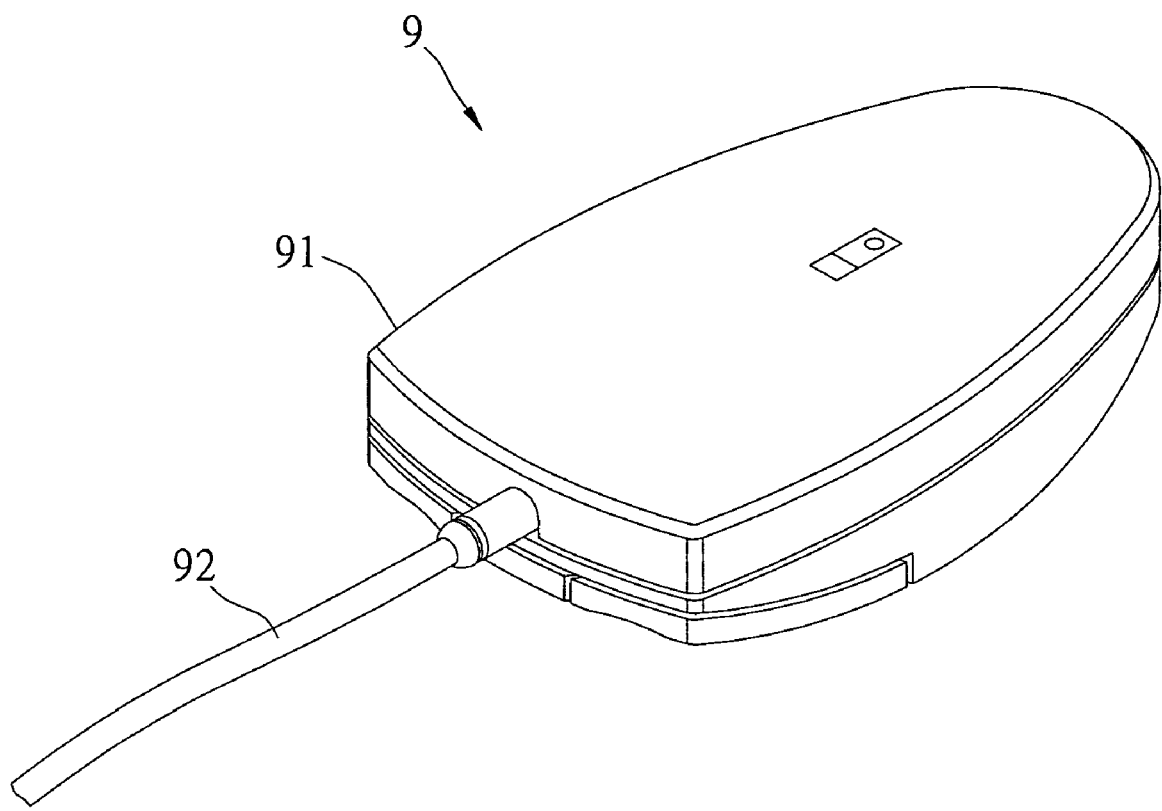
FIG. 1 is a perspective view of a mouse of the prior art.
Figure 2:
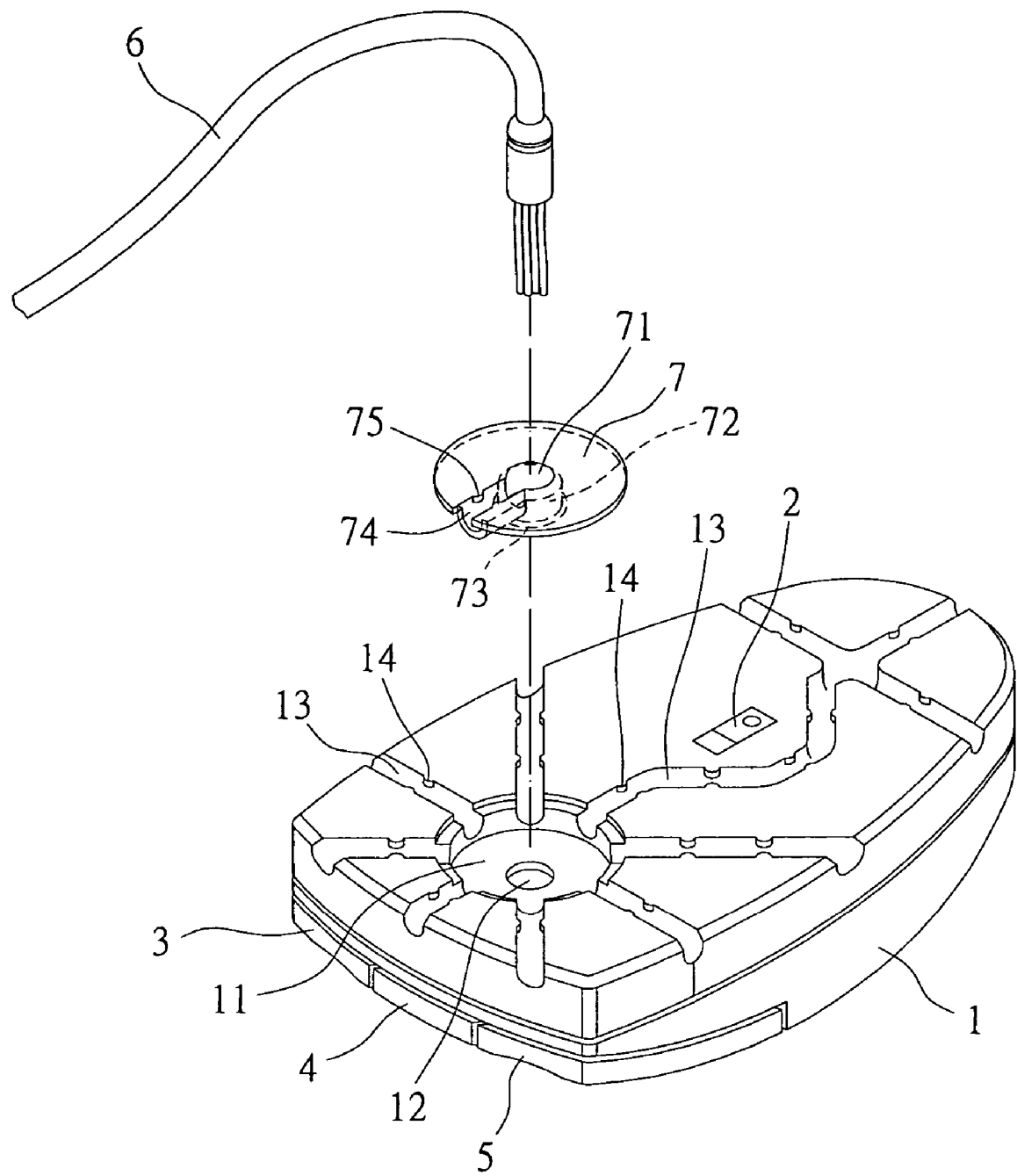
FIG. 2 is an exploded perspective view of a mouse of the present invention.
Figure 3:
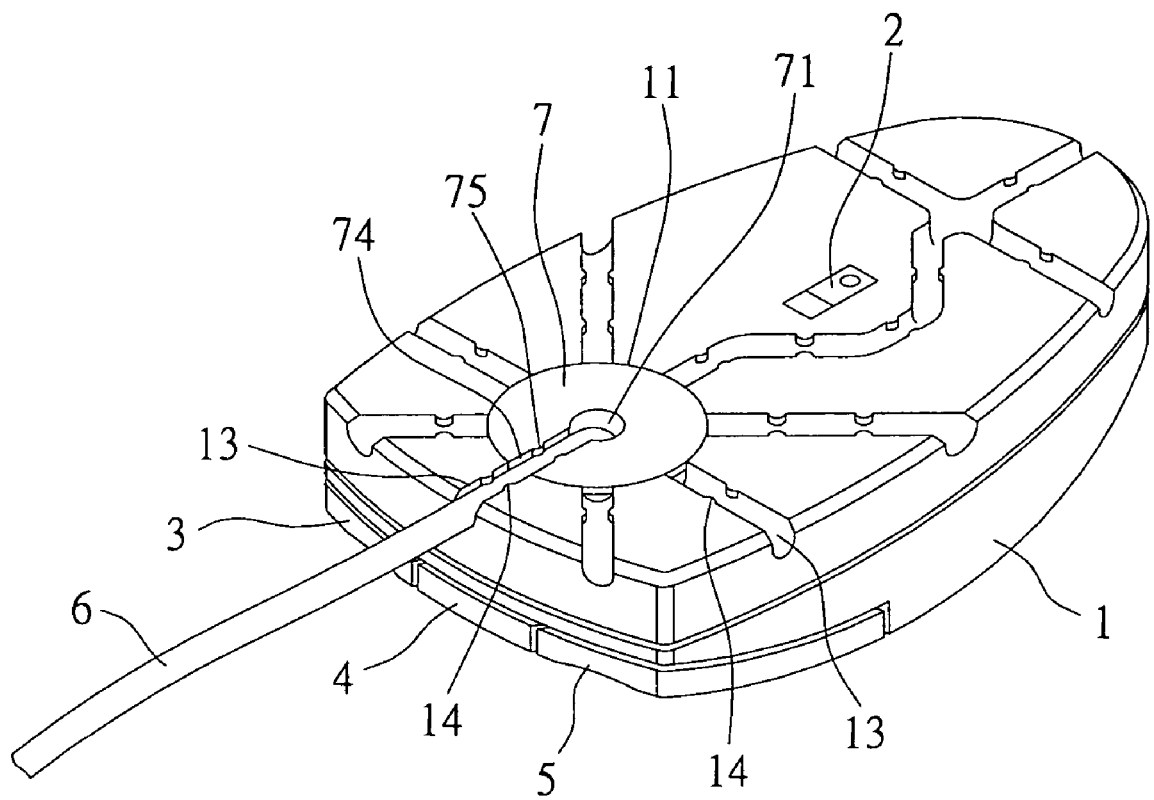
FIG. 3 is a perspective view of a mouse of the present invention.

Reference is made to FIG. 2 and FIG. 3. A mouse with direction-adjustable connecting wire that comprises a housing 1, a cursor control unit 2, a plurality of mouse buttons 3, 4 and 5, a connecting wire 6, and a turntable 7. The hollow housing 1 is made of a plastic material and a circuit board is disposed therein (not shown).

The cursor control unit 2 is a mechanical or optical control device. In the embodiment of the present invention, the cursor control unit 2 is an optical control device. The cursor control unit 2 is electrically connected on the circuit board within the housing 1 and exposed to the bottom of the housing 1 for controlling the movement direction and distance of the mouse cursor.

The mouse buttons 3, 4 and 5 are electrically connected on a circuit board within the housing 1 for executing menu command, selecting text or graphics, clicking dialog box buttons, rolling up and down, displaying popup menu, and so on, while clicking the mouse buttons 3, 4 and 5. In addition, a mouse wheel (not shown) is also disposed to scroll the windows.

One end of the connecting wire 6 is disposed in the housing 1 and electrically connected on the circuit board within the housing 1. The other side of the connecting wire 6 has a plug (not shown) for connecting to a computer host so as to transmit the signals between the mouse and the computer host. The other details about the mouse is the same as the prior art, so it is not described more.

The turntable 7 is a circular-plated piece. The the housing 1 is formed with a circular receiving depression 11 on a bottom thereof, that is corresponding to the turntable 7 and pivotably connecting with the turntable 7. A wire hole 71 is formed at a center portion of the turntable 7, and the connecting wire 6 is passed to the turntable 7 via the wire hole 71 and into the housing 1 so as to be electrically connected on the circuit board.

A pivot 72 is protruded from a center of the top of the turntable 7, and the wire hole 71 is formed through the pivot 72. The pivot 72 is pivotably connected with a corresponding pivoting hole 12 that is disposed at the center of the receiving depression 11. Therefore, the turntable 7 is pivotably connected within the receiving depression 11 of the housing 1 by means of the pivot 72. A fastening portion 73 are protruded from the top of the pivot 72 and is fastened in the inner edge of the pivoting hole 12 for preventing the pivot 72 breaks away from the pivoting hole 12.

A locating slot 74 is formed concavely at the bottom of the turntable 7. The locating slot 74 is extended from the wire hole 71 to the outer edge of the turntable 7 along a radial direction. The connecting wire 6 is passed to the wire hole 71 and then contained in the locating slot 74 of the turntable 7 to make the connecting wire 6 be located therein. Besides, a plurality of clamping portions 75 are formed on two opposed inner sides of the locating slot 74 for fixing the connecting wire 6. Hence, the connecting wire 6 can be adjusted to different directions of outlet due to the rotation of the turntable 7.

Additionally, a plurality of external locating slots 13 are formed concavely at the bottom of the housing 1. The locating slots 13 are extended from the receiving depression 11 to the outer edge of the housing 1 along a radial direction and are formed outside of the receiving depression 11. The quantities of the external locating slots 13 aren't limited and it takes fully into account the requirements of the different users to make suitable variation.

The connecting wire 6 is contained in the locating slot 74 of the turntable 7 and can be adjusted to different directions of outlet due to the rotation of the turntable 7. Furthermore, the connecting wire 6 is also contained in the corresponding external locating slot 13 of the bottom of the housing 1 and positioned thereon. And then, the clamping portions 14 are disposed in two opposed inner side of each external locating slot 13 for fixing the connecting wire 6 after adjusting the direction of outlet.

In the embodiment of the present invention, the external locating slots 13 are concavely installed at the bottom of the housing 1, and separately radially extended from the receiving depression 11 to the front end, left side, right side, and rear end of the outer edge of the housing 1 to make the connecting wire 6 be able to be adjusted to the front end, left side, right side, and rear end of the mouse.

Figure 4:
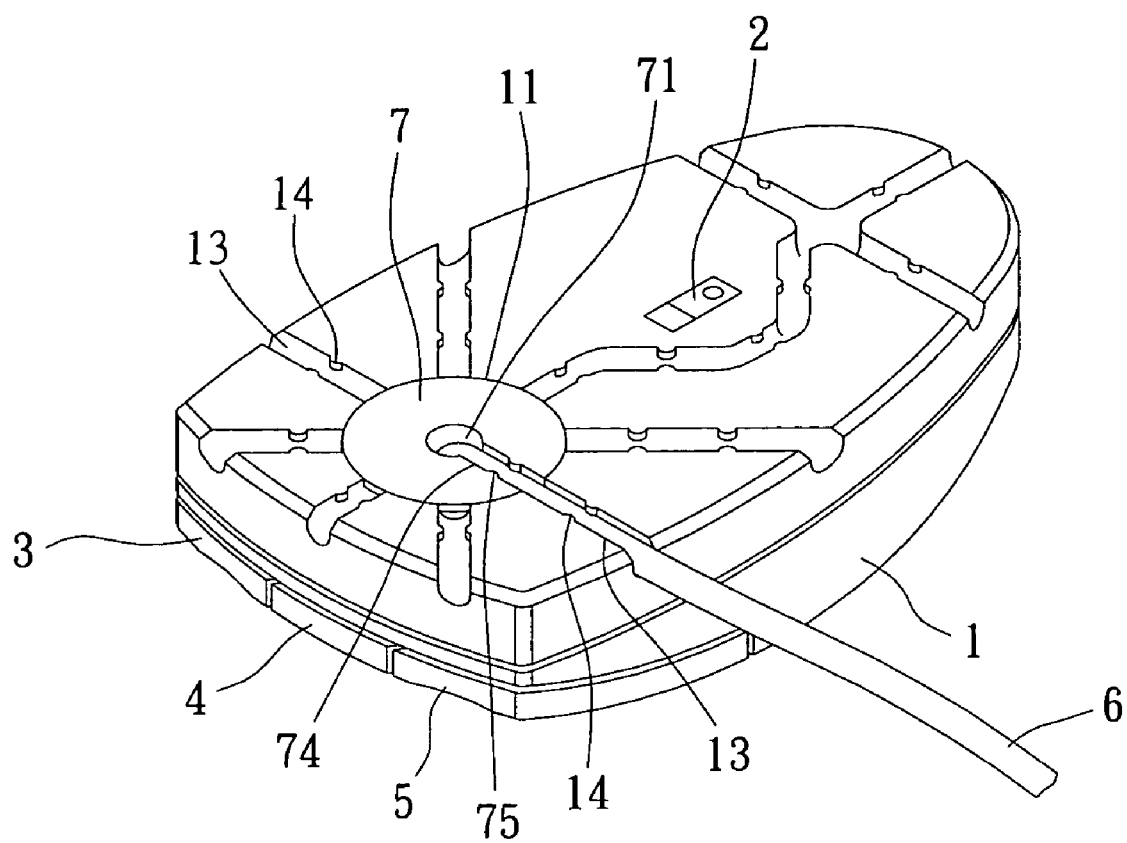
FIG. 4 is a perspective view for another using condition of a mouse of the present invention.

Therefore, a direction-adjustable connecting wire is designed (shown in FIG. 3 and FIG. 4) to make the mouse is easy to be operated and has better controllability without causing the operational inconvenience; for this reason, it takes fully into account the requirements and operation habits of the different users.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A mouse with direction-adjustable connecting wire, comprising:
    a housing having a receiving depression formed at a bottom thereof;
    a connecting wire having one end disposed in the housing; and
    a turntable pivotably disposed in the receiving depression of the bottom of the housing, and the connecting wire passing through and fixed on the turntable;
    wherein the turntable has a top protruded with a pivot protruded from a center thereof, wherein the housing is formed with a pivoting hole in the receiving depression, and the pivot is pivotably connected with the pivoting hole of the receiving depression; wherein the pivot has a fastening portion protruded from a top thereof and fastened in the inner edge of the pivoting hole.

2. The mouse with direction-adjustable connecting wire as in claim 1, wherein the turntable is formed with a wire hole at a center thereof, and the connecting wire is passed to the turntable via the wire hole.

3. A mouse with direction-adjustable connecting wire, comprising:
    a housing having a receiving depression formed at a bottom thereof;
    a connecting wire having one end disposed in the housing; and
    a turntable pivotably disposed in the receiving depression of the bottom of the housing, and the connecting wire passing through and fixed on the turntable, the turntable being concaved with a locating slot from a bottom thereof, the locating slot being extended to an outer edge of the turntable, and the connecting wire being contained in the locating slot of the turntable;
    wherein the turntable has a top protruded with a pivot protruded from a center thereof, wherein the housing is formed with a pivoting hole in the receiving depression, and the pivot is pivotably connected with the pivoting hole of the receiving depression; wherein the pivot has a fastening portion protruded from a top thereof and fastened in the inner edge of the pivoting hole.

4. The mouse with direction-adjustable connecting wire as in claim 3, wherein a plurality of clamping portions are formed on two opposed inner sides of the locating slot for fixing the connecting wire.

5. A mouse with direction-adjustable connecting wire, comprising:
    a housing having a plurality of external locating slots concavely formed at a bottom thereof and extended to an outer side of the housing, and a receiving depression formed at a bottom thereof;
    a connecting wire having one end disposed in the housing, the connecting wire being contained in the corresponding external locating slot of the bottom of the housing; and
    a turntable pivotably disposed in the receiving depression of the bottom of the housing, and the connecting wire passing through and fixed on the turntable;
    wherein the turntable has a top protruded with a pivot protruded from a center thereof, wherein the housing is formed with a pivoting hole in the receiving depression, and the pivot is pivotably connected with the pivoting hole of the receiving depression, wherein the pivot has a fastening portion protruded from a top thereof and fastened in the inner edge of the pivoting hole.

6. The mouse with direction-adjustable connecting wire as in claim 5, wherein the housing further comprises a plurality of clamping portions formed on two opposed inner sides of each the external locating slots for fixing the connecting wire.

* * * * *